United States Patent
Eimer et al.

(10) Patent No.: US 9,381,463 B2
(45) Date of Patent: Jul. 5, 2016

(54) METHOD AND ABSORBER FOR REMOVAL OF ACID GAS FROM NATURAL GAS

(75) Inventors: Dag Arne Eimer, Porsgrunn (NO); Asbjørn Strand, Bønes (NO); Torbjørn Fiveland, Skien (NO); Øystein Engen, Porsgrunn (NO); Helge Folgerø Holm, Bergen (NO); Eirik Manger, Stathelle (NO); John Arild Svendsen, Porsgrunn (NO)

(73) Assignee: STATOIL PETROLEUM AS, Stavanger (NO)

( * ) Notice: Subject to any disclaimer, the term of this patent is extended or adjusted under 35 U.S.C. 154(b) by 378 days.

(21) Appl. No.: 13/992,698

(22) PCT Filed: Dec. 8, 2011

(86) PCT No.: PCT/EP2011/072213
§ 371 (c)(1),
(2), (4) Date: Oct. 23, 2013

(87) PCT Pub. No.: WO2012/076657
PCT Pub. Date: Jun. 14, 2012

(65) Prior Publication Data
US 2014/0047979 A1  Feb. 20, 2014

(30) Foreign Application Priority Data
Dec. 9, 2010 (NO) .................................. 20101718

(51) Int. Cl.
*B01D 53/14* (2006.01)
*B01D 53/18* (2006.01)
(Continued)

(52) U.S. Cl.
CPC ........ *B01D 53/1475* (2013.01); *B01D 53/1425* (2013.01); *B01D 53/1456* (2013.01);
(Continued)

(58) Field of Classification Search
CPC .................. B01D 2252/204; B01D 2257/304; B01D 2257/504; B01D 3/08; B01D 53/1425; B01D 53/1456; B01D 53/1475; B01D 53/18; C10L 3/102
See application file for complete search history.

(56) References Cited

U.S. PATENT DOCUMENTS

| 3,486,743 A | 12/1969 | Todd |
| 2001/0037728 A1 | 11/2001 | Schimkat et al. |

(Continued)

FOREIGN PATENT DOCUMENTS

| EP | 0002568 A1 | 6/1979 |
| EP | 0023745 A2 | 2/1981 |

(Continued)

OTHER PUBLICATIONS

Search Report received for Norwegian Patent Application No. 20101718, dated Jul. 7, 2011, 2 pages.

(Continued)

*Primary Examiner* — Duane Smith
*Assistant Examiner* — Cabrena Holecek
(74) *Attorney, Agent, or Firm* — Morrison & Foerster LLP

(57) ABSTRACT

The invention relates to a continuous process for removal of acid gas, such as carbon dioxide (CO2) from a fluid stream, such as natural gas comprising mainly hydrocarbons, by means of a absorbent medium in a rotating absorption zone. Subsequently, the acid gas is desorbed in a rotating desorption zone from the absorbent medium to allow the absorbent medium to be recirculated and the acid gas is removed for storage or drying and processing. This process can be carried out continuously, as the absorption medium is re-used.

10 Claims, 9 Drawing Sheets

(51) Int. Cl.
*C10L 3/10* (2006.01)
*B01D 3/08* (2006.01)

(52) U.S. Cl.
CPC ............... *B01D53/18* (2013.01); *C10L 3/102* (2013.01); *B01D 3/08* (2013.01); *B01D 2252/204* (2013.01); *B01D 2257/304* (2013.01); *B01D 2257/504* (2013.01); *Y02P 70/34* (2015.11)

(56) References Cited

U.S. PATENT DOCUMENTS

| | | | |
|---|---|---|---|
| 2004/0265199 | A1 | 12/2004 | MacKnight |
| 2011/0131937 | A1* | 6/2011 | Ming ................ B01D 53/1475 55/474 |
| 2011/0303088 | A1* | 12/2011 | Dutra E Mello ......... B01D 3/08 95/151 |
| 2012/0175241 | A1* | 7/2012 | Strand ................ B01D 19/0015 203/49 |

FOREIGN PATENT DOCUMENTS

| | | |
|---|---|---|
| EP | 0084410 A2 | 7/1983 |
| EP | 0204193 A2 | 12/1986 |
| EP | 0776687 A1 | 6/1997 |
| WO | 98/43729 A1 | 10/1998 |

OTHER PUBLICATIONS

Ramshaw, C. (1993). "The Opportunities for Exploiting Centrifugal Fields," Heat Recovery Systems & CHP 13(6): 493-513.

International Search Report and Written Opinion received for PCT Patent Application No. PCT/EP2011/072213, mailed on Apr. 16, 2012, 8 pages.

* cited by examiner

METHOD AND ABSORBER FOR REMOVAL OF ACID GAS FROM NATURAL GAS

CROSS REFERENCE TO RELATED APPLICATIONS

This application is a U.S. National Phase patent application of PCT/EP2011/072213, filed on Dec. 8, 2011, which claims priority to Norwegian Patent Application No. 20101718, filed on Dec. 9, 2010, each of which is hereby incorporated by reference in the present disclosure in its entirety.

TECHNICAL FIELD

The present invention relates to a method and device for removal of acid gas from natural gas by means of absorbent mediums or solvents.

BACKGROUND ART

Removal of acid gas, such as carbon dioxide ($CO_2$) and/or hydrogen sulphide (H2S) from natural gas, commonly termed "gas sweetening" is a well known technology. There are several commercial technologies available for this purpose such as absorbent mediums or solvents (i.e. amines, glycol), physical solvents, membranes, cold processes, etc. Such an absorbent medium can also be referred to as a lean absorbent, prior to the absorption of acid gas from the natural gas, or a rich absorbent, after the absorption of acid gas from the natural gas.

Chemical solvents such as amines are widely used and extensive operating experience has been gained. Examples of applicable absorbents comprise amine based absorbents such as primary, secondary and tertiary amines; one well known example of applicable amines is mono ethanol amine (MEA). The liquid diluent is selected among diluents that have a suitable boiling point, are stable and inert towards the absorbent in the suitable temperature and pressure interval. An example of an applicable diluent is water. Examples of suitable amines for use with a diluents such as water are aqueous solutions of monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA), methyldiisopropanolamine (MDIPA), 2-amino-1-butanol (2-AB) or mixtures thereof. The removal process comprises a closed circulation loop containing the solvent. In an amine based absorption process the $CO_2/H_2S$ reacts with the amine in an absorber unit and is bound strongly to the solvent. The reaction between the amine and the acid gas is strongly exothermic. The solvent can be regenerated, often by combining flash regeneration by pressure reduction and thermal regeneration by supplying heat in a stripper, where the $CO_2/H_2S$ is released from the solvent. The regenerated solvent is passed through suitable compressor and heat exchange units for pressurization and temperature adjustment, and is returned to the absorber unit. A typical, conventional amine plant using an absorber column is schematically shown in FIG. 9.

In the prior art arrangement shown in FIG. 9, there is provided an acid gas removal process wherein a sour gas stream containing undesirable hydrogen sulphide ($H_2S$) and carbon dioxide ($CO_2$) is introduced to a contact absorber A through line 901. As the sour gas flows upward through absorber A the sour gas contacts downward flowing mixture of normal lean amine which is introduced to the absorber through line 902. The process gas has most of the acid gases removed by the time it leaves the absorber after contacting the lean amine from line 902. A product gas (sweet gas) having a substantially reduced content of the hydrogen sulphide and carbon dioxide is withdrawn from the top of the absorber via line 903.

A stream of rich amine solution containing absorbed hydrogen sulphide and carbon dioxide as salts of amine is removed from the absorber through line 904. The pressure of the solution is reduced and it then goes to a rich amine flash tank C. The flash gases exit through line 905 and the rich amine solution exits through line 906. The rich amine stream passes through a lean/rich heat exchanger D to recover sensible heat from hot lean amine and is then introduced to an amine regenerator stripping column B through line 907. Internal stripping steam is generated by reboiling the amine solution in a stripper reboiler, or a heat exchanger E, using a suitable heat medium 908. The lean amine temperature can vary from about 100° C. to 140° C., depending on the type of amine, its concentration and its pressure. The steam generated from the reboiled amine is introduced near the bottom of stripping column B through line 911 and passes upward through the amine solution providing heat to decompose the hydrogen sulphide and carbon dioxide amine salts and the stripping vapour to sweep the acid gas away from the amine solution and out of the stripping column. The mixture of steam, hydrogen sulphide, and carbon dioxide exits the stripper overhead through line 910.

A hot lean amine stream 909 exits the bottom of the stripper B, is passed through the lean/rich heat exchanger D and through a cooler F where the lean amine solution is cooled to a temperature of about 35° C. to 55° C. The cooled lean amine stream in line 912 continues through line 902 to the top of the absorber A.

Current process equipment as used at e.g. at the Sleipner T installation is very large. In this case, the absorber column inner diameter is almost 4 m and the total height is almost 18 m. The footprint and weight of the absorber column are thus significant. Depending on the applied amine and amount of acid gas to be removed the circulation rates on the solvent will also be significant. This requires a significant amount of power for pumping, heating and cooling of the circulating amine solution. Amine solutions are also known to be corrosive, especially in the $CO_2$ rich parts of the process. Depending on operating conditions and impurities accumulated in the solution, the amine is susceptible to degradation and contamination. Equipment using amines may also experience various types of failure caused, for instance, by foaming or by insufficient contact between gas and liquid. Foaming of the gas and liquid, caused by e.g. condensation of hydrocarbon or solids suspended in the gas after insufficient pre-filtration, is also a known issue in conventional absorbers. Carry-over of amine droplets in the sweet gas from the absorber to downstream equipment is another cause of foaming. A further problem with the absorber column relates to the importance of maintaining good contact between the natural gas and the liquid amine and to provide a good liquid distribution in order to achieve an effective removal of acid gas.

The object of the invention is to solve the above problems by providing an improved process for the removal of acid gas from natural gas by means of a absorbent medium, and for the regeneration of the absorbent medium by the removal of acid gas from the absorbent.

DISCLOSURE OF INVENTION

It is an object of the present invention to provide a novel process for removal of acid gas from natural gas by means of a absorbent medium and subsequent removal of acid gas from the absorbent medium. The object is achieved by means of a process as described in the appended claims.

The invention relates to a continuous process for removal of acid gas, such as carbon dioxide ($CO_2$) from a fluid stream, such as natural gas comprising mainly hydrocarbons, by means of a absorbent medium. Subsequently, the acid gas is desorbed from the absorbent medium to allow the absorbent medium to be recirculated and the acid gas is removed for storage or drying and processing. This process can be carried out continuously, as the absorption medium is re-used. The process comprises the steps of;

supplying a pressurized fluid stream and a lean absorption medium comprising a liquid diluent and at least one amine to an absorber;

passing the fluid stream, which is in contact with the lean absorption medium within a rotating absorption zone in the absorber, wherein the acid gases are removed from the fluid stream by the lean absorption medium when passing through the rotating absorption zone;

passing rich absorption medium containing said acid gases into a first rotating desorption zone within a desorber, wherein a first portion of the acid gases are removed from the rich absorption medium by means of a heated vapour to obtain a partially regenerated absorption medium, passing the partially regenerated absorption medium into a second rotating desorption zone within the desorber; wherein the remaining portion of the acid gases are removed from the partially regenerated absorption medium by heating the absorption medium to evaporate said acid gases and a portion of the absorption medium containing amine and liquid diluent into a vapour;

passing said vapour through said first rotating desorption zone; and passing said vapour to a rotating condenser within the desorber, wherein the diluent is condensed and the acid gases are removed.

The absorption process outlined above can comprise supplying the lean absorption medium to an inner portion of at least one annular rotating absorber unit within the absorber, causing the lean absorption medium to flow radially outwards through the rotating absorption zone; and supplying the pressurized fluid stream to an outer portion of said annular rotating absorber unit, causing the fluid stream to flow radially inwards in order to create a radial cross-flow in the absorption zone. In this way, acid gases are absorbed from the fluid stream by the lean absorption medium during the resulting radial cross-flow through the rotating absorption zone. The cross-flow is created by the pressurized fluid stream being forced radially inwards and the absorption medium being forced radially outwards by centrifugal forces caused by the rotation of the absorption zone.

The pressurized fluid stream flows radially inwards and is removed from an inner perimeter of the rotating absorption zone. At this stage the content of acid gases in the fluid stream has been reduced to a predetermined level. At the same time, the absorption medium flows radially inwards and is removed from an outer perimeter of the rotating absorption zone. The rich absorption medium with its content of absorbed acid gas is transferred to a desorber for regeneration.

As stated above, the absorber comprises at least one annular rotating absorber unit. Preferably the lean absorption medium is supplied to a pair of identical and mirrored annular rotating absorber units rotating about a common axis within the absorber. By arranging the absorber units in this way it is possible to avoid problems with, for instance, balancing of the rotating components during high speed rotation of the absorber units. This will be described in further detail below.

The desorption process outlined above can comprise supplying the rich absorption medium to an inner portion of at least one annular rotating desorber unit, causing the rich absorption medium to flow radially outwards through the first rotating desorption zone. Heated vapour is supplied to an outer perimeter of the first rotating desorption zone, causing the vapour to flow radially inwards in order to create a radial cross-flow in the first rotating desorption zone. During this radial cross-flow the first portion of acid gases are desorbed from the rich absorption medium by the vapour during said radial cross-flow. The cross-flow is created by vapour under pressure being forced radially inwards and the absorption medium being forced radially outwards by centrifugal forces caused by the rotation of the first desorption zone. The release of the first portion of acid gases is achieved by the said vapour heating the absorption medium to a predetermined temperature, which is dependent on the type of absorption medium used.

The partially regenerated absorption medium will be forced through the first rotating desorption zone and into the second rotating desorption zone, where the remaining acid gases are removed to produce a lean absorption medium. This is achieved by supplying heat to a heat exchanger in the second rotating desorption zone, wherein the remaining portion of the acid gases and a portion of the absorption medium containing amine and liquid diluent are heated to form a vapour. The evaporation causes an increase in pressure which forces the vapour radially inwards through both the second and the first rotating desorption zones. This flow of vapour through the first rotating desorption zone has been described above. Lean absorption medium is removed from an outer perimeter of the second rotating desorption zone and transferred back to an absorber.

The first and the second rotating desorption zones described above are preferably arranged as concentric annular desorption zones rotating about a common central axis. The first rotating desorption zone performs the same function as a conventional stripper unit, while the second rotating desorption zone performs the same function as a conventional reboiler unit.

Alternatively, desorption is performed in a single rotating desorption zone comprising an integrated annular stripper and reboiler unit rotatable about a common axis. The stripper and reboiler unit can be provided with a number of tubes for heat supply. A heating medium such as steam is supplied to an inlet and flows through the tubes, which are preferably arranged in parallel with the axis of rotation. The tubes are supplied with steam for heating the entire stripper and reboiler unit and are connected to an outlet for removing the condensed steam. The $CO_2$ rich absorbent medium is introduced at an inner perimeter of the stripper and reboiler unit and the stripping will take place as the absorbent medium is heated while flowing radially outwards. Regenerated lean absorbent medium leaves the stripper and reboiler unit at the outer circumference thereof at a lean absorbent medium outlet. The $CO_2$ and an amount of absorbent medium comprising absorbent and diluent in vapour phase leaves the stripper and reboiler unit near its inner perimeter. The $CO_2$ and absorbent medium vapour is then directed into the outer perimeter a condenser.

In a conventional stripper unit, the residence time of a rich absorption medium in contact with a heated vapour, such as steam, is determined by the temperature of the steam. If the temperature is too low, then the absorption medium may not be completely regenerated. If the temperature is increased then the acid gases are removed more effectively. However, if the temperature is too high or the residence time too long, this will cause degradation of the absorption medium. The amine temperature can vary from about 100° C. to 140° C., depending on the type of amine, its concentration and its pressure. The use of a rotating desorption unit will allow higher temperatures to be used, as the residence time is considerably shorter compared to a conventional stripper unit. In a process according to the invention, the absorption medium can pass the rotating desorption zones within 2-10 seconds, depending on the diameter of the desorption unit.

As stated above, the vapour flows radially inwards through both the first and the second rotating desorption zones. Alternatively, the vapour flows radially inwards through a single rotating desorption zone. The vapour is then removed from an inner perimeter of the first or the single rotating desorption zone and passed to an outer portion of the rotating condenser. The alternative desorbers described above can be combined with either of the condensers described below.

In one example, the condenser is arranged to rotate about the same axis as the rotating desorption zones and is preferably provided with two separate sections placed side-by-side. The condenser sections can be supplied by a common source or by individual sources of coolant. According to one example, the condenser sections are supplied by a single source of coolant, which is supplied to an inner portion of the second condenser section. The coolant is then passed to the first condenser section at an outer portion thereof and is subsequently removed from an inner portion of the first condenser section.

The heated vapour is supplied to the outer portion of a first section of the rotating condenser, causing the vapour to flow radially inwards through the first section of the rotating condenser. The flow of vapour is caused by the internal pressure forcing the vapour towards an outlet from the desorption unit. The flow can be assisted by an external pump unit for removing CO2 from the desorber. The portion of the absorption medium containing amine and diluent in the vapour is condensed into liquid amine and a portion of liquid diluent; The condensed liquid containing amine and diluent is removed from the outer portion of the first section of the rotating condenser. This condensed liquid is returned to the inner perimeter of the first or the second rotating desorption zone.

The remaining heated vapour is supplied to an inner portion of a second section of the rotating condenser, causing the remaining heated vapour to flow radially outwards through the second section of the rotating condenser, The remaining portion of diluents, which is free of amine, is condensed and is made to flow radially outwards by centrifugal forces caused by the rotation of the condenser.

The liquid diluent and desorbed acid gases are removed from the outer portion of the second section of the rotating condenser. The acid gases are removed from the desorber for further processing, while the condensed amine-free diluent can be returned to the absorber to be used as a washing liquid in the absorption process.

Alternatively, the condenser is provided with a single condenser section placed side-by-side with the desorber section. The condenser section is supplied by a source of coolant, wherein the coolant is introduced adjacent the inner portion of the condenser section and flows radially outwards to an outlet adjacent the outer portion of the condenser section. In this example, the portion of the vapour containing absorption medium received from the desorber section is condensed in a single step. The condensed liquid containing amine and diluent is removed from the outer portion of the first section of the rotating condenser. This condensed liquid is returned to the inner perimeter of the first or the second rotating desorption zone. At the same time, desorbed acid gases from the outer portion of the condenser section are removed from the desorber for further processing.

In the above examples, the rich absorption medium is preferably supplied to a pair of identical and mirrored annular rotating desorber units rotating about a common axis within the desorber. A desorber unit used in the process described above can be defined as comprising an inner stripper section and and outer reboiler section, arranged concentrically and rotated about the same axis. Alternatively, the desorber unit can be defined as comprising an integrated stripper and reboiler section, rotated about the same axis The desorber further comprises a condenser unit with a single section or a double section arranged axially displaced from the stripper and reboiler sections and rotated at the same speed about the same axis.

The process according to the invention uses an absorber for removal of acid gas from natural gas by means of a absorbent medium. The absorber comprises a vessel containing at least one annular absorber packing rotatable about its longitudinal axis within the vessel, which absorber packing has a predetermined axial extension with an inner radius and an outer radius. The absorber further comprises an lean absorbent inlet, arranged radially inside an inner perimeter of the absorber packing, and a rich absorbent outlet, arranged radially outside an outer perimeter of the absorber packing. The absorber also comprises a natural gas inlet for pressurized natural gas, arranged radially outside an outer perimeter of the absorber packing, and a natural gas outlet, arranged radially outside an outer perimeter of the absorber packing.

When the absorber packing is rotated around its longitudinal axis, a cross flow of absorbent and natural gas occurs. The rotation of the annular absorber packing is arranged to subject the absorbent medium to a centrifugal force sufficient to force the absorbent towards the outer perimeter of the annular absorber packing, in the opposite direction of the natural gas, in order to cause a cross flow for mass transfer of acid gas from the natural gas to the absorbent to produce sweet natural gas.

As described above, the at least one annular absorber packing has a substantially cylindrical shape with a predetermined extension along its longitudinal axis. An absorber packing assembly can comprise a single absorber packing or multiple absorber packings which are symmetrical on either side of a central plane at right angles to the rotational axis of the absorber packing. The central plane is, for instance, taken through a position located at the mid-point of a single absorber packing or through a position half way between the facing ends of two absorber packings located end-to-end with an axial separation along a common axis of rotation. Preferably, the at least one absorber packing and any component parts enclosed by or enclosing the absorber packing and rotated with the said absorber packing should be symmetrical or substantially symmetrical relative to the central plane. The said absorber packing has an outer perimeter in the form of a cylindrical surface at a first radius from the longitudinal axis and an inner perimeter in the form of a cylindrical surface at a second radius from the longitudinal axis. The thickness of the annular absorber packing is determined by the difference between the said first and second radii. The absorber packing is preferably filled with a material having a relatively high specific area, such as a metal foam or a similar suitable alveolar material.

The pressurized natural gas is supplied to an inlet at the outer perimeter of the at least one annular absorber packing, from where it flows radially inwards towards the centre of the absorber packing. As the natural gas flows through the absorber packing, the cross-flow with the absorbent medium removes acid gas from the natural gas, leaving a sweet natural gas. The sweet natural gas is guided from the inner perimeter of the annular absorber packing towards an outlet at the outer perimeter of said absorber packing through a radially open section in the annular absorber packing. The outlet is separated from the inlet by at least one radial wall that extends from the inner perimeter of the annular absorber packing to a gas tight seal at the inner wall of the vessel.

The absorbent medium is supplied as a lean absorbent to an inlet at an inner perimeter of an annular absorber packing through a hollow rotor shaft supporting the absorber packing. From the central inlet, the lean absorbent flows through the hollow shaft and into radially extending channels. The channels are connected to axially extended distribution tubes along the inner perimeter of the absorber packing. A number of openings or nozzles are arranged at regularly spaced locations along the distribution tubes adjacent the inner perimeter to provide a substantially even distribution of absorbent medium around the inner cylindrical surface of the absorber packing. The said nozzles may be kept stationary relative to the rotating absorber packing, or be rotated at a different speed than said absorber packing. As the annular absorber packing is rotated, the absorbent medium is forced from the inner perimeter towards the outer perimeter of the annular absorber packing by relatively high centrifugal force which, depending on the speed of rotation, can be several hundred G. The absorbent medium, which at this stage is a rich absorbent, will be thrown radially outwards onto the inner wall of the vessel upon leaving the absorber packing and will then flow downwards to an outlet at the lower portion of the vessel.

In the case of an absorber packing rotated about a horizontal axis, the natural gas outlet is axially spaced from both the absorbent outlet and the natural gas inlet. The absorbent outlet can be arranged radially outside an outer perimeter of the absorber packing in a lower section of the vessel. Also, the natural gas inlet can be arranged radially outside an outer perimeter of the absorber packing circumferentially spaced from the absorbent outlet, that is, above the lower section of the vessel.

The annular absorber packing can comprise a radially open section extending from the inner perimeter to the outer perimeter of the annular absorber packing, wherein the open section is arranged to guide sweet natural gas from the inner perimeter towards an outlet at the outer perimeter of said absorber packing. As indicated above, the outlet from an open section is arranged separate from the inlet in the axial direction of the absorber packing. The annular absorber packing can be provided with an open section at either end of the absorber packing or between two substantially identical absorber sections making up the absorber packing.

Kinetic energy can be recovered from the sweet natural gas by means of radial vanes arranged in the said open section. As described above, a radially open section can be arranged between two adjacent annular absorber packings, or at each end of the at least one annular absorber packing. Droplet traps, as indicated above, can be arranged at the outer perimeter of the annular absorber packing adjacent the said open section, wherein absorbent droplets are recovered from the sweet natural gas.

According to the present invention, the traditional gravimetrical packed absorber column is replaced with a relatively high speed rotating annular column where a much more dense packing can be used in combination with more viscous absorbents. This is made possible because centrifugal forces of more than 400 G may be reached.

In operation, the absorber unit is arranged to operate as follows:
  supplying pressurized natural gas containing acid gas to an outer perimeter of at least one annular absorber packing, wherein the natural gas is forced towards the inner perimeter of the annular absorber packing;
  supplying a absorbent medium to an inner perimeter of the annular absorber packing;
  rotating the annular absorber packing about its longitudinal axis, subjecting the absorbent medium to a centrifugal force sufficient to force the absorbent towards the outer perimeter of the annular absorber packing in the opposite direction of the natural gas;
wherein a cross flow for mass transfer of acid gas from the natural gas to the absorbent medium occurs to produce sweet natural gas.

The acid gas can comprise $CO_2$ and/or $H_2S$, and the natural gas comprises mainly hydrocarbons. A suitable absorbent medium for this purpose is an ammonia compound such as amine.

The at least one annular absorber packing has a substantially cylindrical shape with a predetermined extension along its longitudinal axis. The said absorber packing has an outer perimeter in the form of a cylindrical surface at a first radius from the longitudinal axis and an inner perimeter in the form of a cylindrical surface at a second radius from the longitudinal axis. The thickness of the annular absorber packing is determined by the difference between the said first and second radii.

The subsequent text refers to a number of different gas or liquid inlets and outlets. Any references to such inlets and outlets in determinate form should be interpreted as "at least one" inlet or outlet, unless otherwise specified.

The pressurized natural gas is supplied to an inlet at the outer perimeter of the at least one annular absorber packing, from where it flows radially inwards towards the centre of the absorber packing. As the natural gas flows through the absorber packing, the cross-flow with the absorbent medium removes acid gas from the natural gas, leaving a sweet natural gas. The method comprises the further step of guiding the sweet natural gas from the inner perimeter of the annular absorber packing towards an outlet at the outer perimeter of said absorber packing through a radially open section in the annular absorber packing. The outlet is separated from the inlet by at least one radial wall that extends from the inner perimeter of the annular absorber packing to a gas tight seal at the inner wall of the vessel.

The absorbent medium is supplied to an inlet at an inner perimeter of an annular absorber packing through a rotor shaft extending through the absorber packing. From the central inlet, absorbent medium flows through the hollow shaft and into radially extending channels in the distribution means towards openings or nozzles arranged at regularly spaced locations along an outer limiting peripheral surface adjacent the inner perimeter of the absorber packing to provide an initial distribution of absorbent medium around the inner cylindrical surface of the absorber packing. The said nozzles may be kept stationary relative to the rotating absorber packing, or be rotated at a different speed than said absorber packing.

As the annular absorber packing is rotated, the absorbent medium is forced from the inner perimeter towards the outer perimeter of the annular absorber packing by relatively high centrifugal force which, depending on the speed of rotation and the diameter, can be several hundred G. The absorbent medium, which at this stage is a rich absorbent, will be thrown radially outwards onto the inner wall of the vessel upon leaving the absorber packing and will then flow downwards to an outlet at the lower portion of the vessel.

The method can involve a further step of recovering kinetic energy from the sweet natural gas by means of radial discharge vanes arranged in the said open section. The radial discharge vanes are fixed to the at least one absorber packing and form a turbine or impeller wheel which is acted on by the pressurized sweet natural gas, whereby momentum is transferred from the flowing gas to the rotating absorber packing. This energy recovery allows the power consumption for driving the rotating absorber packing to be reduced.

According to one example, the energy recovery is achieved by guiding sweet natural gas through a radially open section arranged between two sections of annular absorber packings towards the outlet. In this example the outlet is separated from the inlet by a pair of radial walls which extend from the inner perimeter of the annular absorber packing towards the inner wall of the vessel. The respective radial walls are attached to facing annular end surfaces of the absorber packing sections and are mechanically connected to the radial vanes. A further radial wall can be provided between the said radial walls, extending from the rotor shaft to the outer perimeter of the absorber packings, in order to assist and guide the flow of natural gas towards the outlet.

According to a second example, the energy recovery is achieved by guiding sweet natural gas through radially open sections arranged at each end of the annular absorber packing. towards the outlet. As in the above example the outlet is separated from the inlet by a pair of radial walls which extend from the inner perimeter of the annular absorber packing towards the inner wall of the vessel. The respective radial walls are attached to opposing annular end surfaces of the absorber packing sections and are provided with radial vanes located on the side of the respective wall remote from the end of the absorber packing.

Depending on the longitudinal extension of the absorber packing, a combination of the examples described above is also possible.

The sweet natural gas discharge vanes have the additional function of separate absorbent medium droplets from the gas flow. The latter function requires some sort of droplet traps to be integrated in the design. The recovery of absorbent droplets from the sweet natural gas can be achieved by means of droplet traps arranged at the outer perimeter of the annular absorber packing adjacent at least one side of the said open section or sections described above. The droplet traps may comprise a labyrinth or analogues type of seal to prevent the gas flow from taking a short cut from the inlet directly to the outlet, past the at least one radial wall.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein:

EMBODIMENTS OF THE INVENTION

Figure 1:
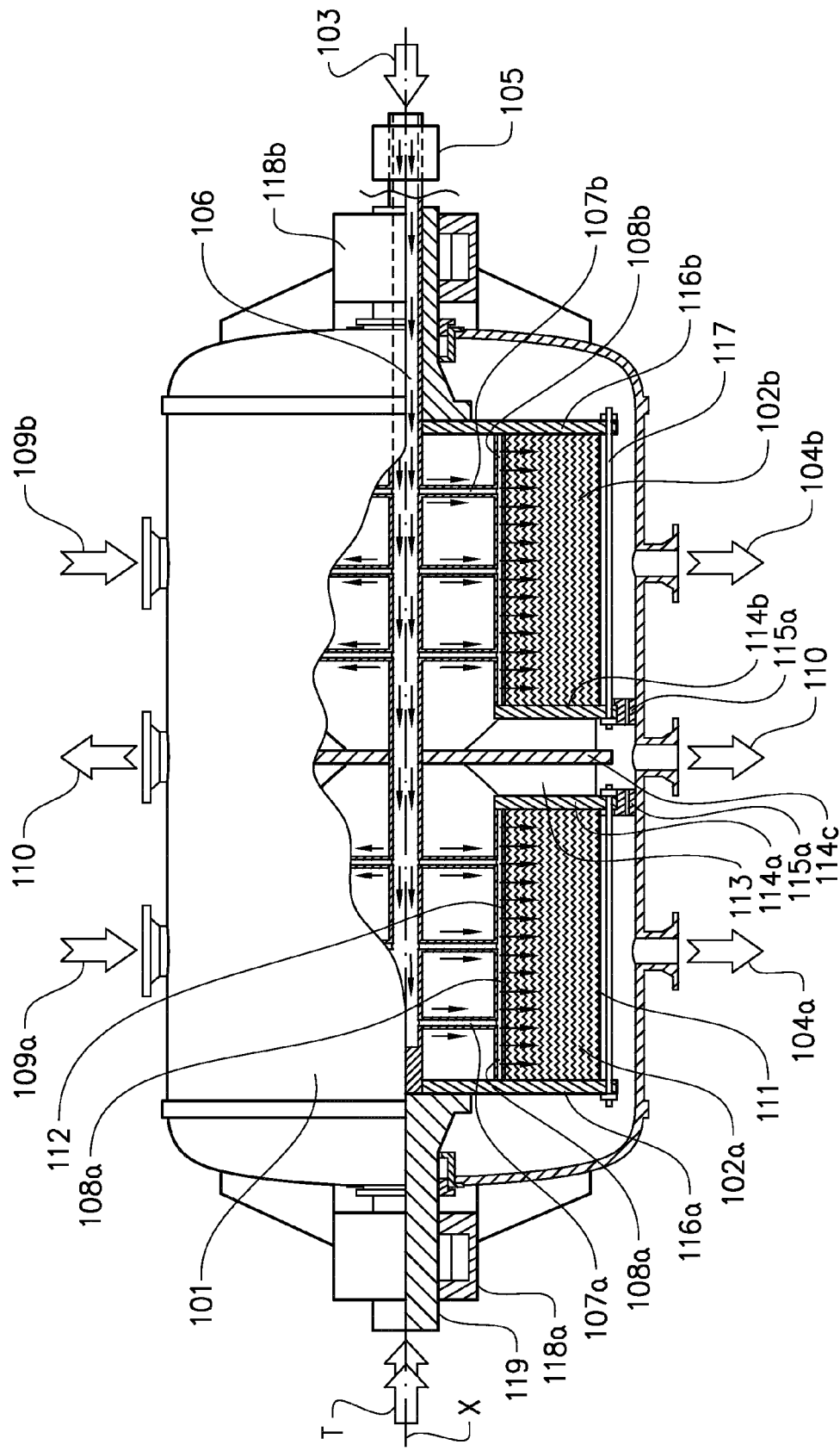
FIG. 1 shows a schematic, partially cross-sectioned absorber for use in a process according to the invention.

FIG. 1 shows a schematic, partially cross-sectioned absorber for use in a process according to the invention. The absorber in FIG. 1 comprises a vessel 101 in the form of a cylindrical outer stator shell containing a first and a second annular absorber packing 102a, 102b rotatable about a longitudinal axis X within the vessel 101, which absorber packings have a predetermined axial extension with an inner radius r and an outer radius R (see FIG. 3). The absorber further comprises an absorbent inlet 103, arranged for supplying lean absorbent to the absorber packing, and absorbent outlets 104a, 104b, arranged for removing rich absorbent on the vessel radially outside the outer perimeter 111 of the absorber packings at the lower section of the vessel 101. Lean absorbent is supplied to the vessel 101 from a conduit (not shown) connected to a rotary joint 105 attached to an inlet shaft 106 in the form of a hollow idle shaft comprising a central pipe for transport of lean absorbent through the inlet shaft 106 to a number of radial channels 107a, 107b for transport of lean absorbent to a number of longitudinal distribution tubes 108a, 108b, which distribution tubes adjacent the inner perimeter 112 of the absorber packings 102a, 102b is provided with nozzles (not shown) for even distribution of lean absorbent tangentially and axially on the inner perimeter of the absorber packings. The absorber also comprises natural gas inlets 109a, 109b for pressurized natural gas, arranged radially outside an outer perimeter of the absorber packing, and natural gas outlets 110, arranged on the vessel radially outside the outer perimeter of the absorber packing. In this example, the natural gas outlets 110 are arranged axially separated from the natural gas inlets 109a, 109b, and aligned with a radially open section 113 separating the absorber packings 102a, 102b. The arrangement in FIG. 1 has four natural gas outlets 110 arranged in a radial plane through the vessel, which outlets are located equidistant around the circumference of the vessel. The radially open section 113 is separated from the natural gas inlets 109a, 109b and the facing end surfaces of the absorber packings 102a, 102b by first and second radial walls 114a, 114b. Each radial wall 114a, 114b extends from the inner perimeter of the annular absorber packing to a gas tight labyrinth seal 115a, 115b at the inner wall of the vessel. A third radial wall 114c is located between the first and second radial walls 114a, 114b and extends from the inlet shaft 106 to the outer perimeter of the absorber packings 102a, 102b. The third radial wall 114c is provided to guide the flow of sweet natural gas from the inner perimeter of the absorber packings towards the natural gas outlets 110.

The opposing end surfaces of the absorber packings 102a, 102b are sealed by a pair of rotor end plates 116a, 116b to form a an absorber packing assembly or rotor assembly. The rotor end plates 116a, 116b are each supported inside the vessel by a rotor shaft journalled at each end of the vessel. The rotor assembly is held together by means of multiple axial tension rods 117 (one shown) which extend through all the radial walls in the assembly outside the outer perimeter of each absorber packing and are bolted to the rotor end plates and the radial walls 114a, 114b adjacent the open section 113. The vessel 101 comprises a cylindrical outer stator shell having a pair of end domes, wherein each dome is provided with a gas tight seal 118a, 118b around the respective rotor shaft. The entire absorber assembly located between these rotor shafts is rotated as a unit by a driving torque T applied to a driven rotor shaft 119 located on the opposite side of the vessel relative to the absorbent inlet 103. The absorber packing assembly comprises two absorber packings which are symmetrical on either side of a central plane at right angles to the rotational axis of the absorber packing. The central plane is, in this case, taken through a position half way between the facing ends of two absorber packings located end-to-end or with an axial separation along a common axis of rotation.

For the embodiment described in FIG. 1, an example of a suitable size for the absorber arrangement is a pair of absorber packings each having an inner diameter of 1 m, an outer diameter of 2.5 m and a length of 2.2 m. Using a suitable metal foam having a surface area of 2500 m2/m3, theses dimensions give surface area of 223 m3 and a volume of 18 m3 of metal foam. Four natural gas inlets with a diameter of 200-250 mm will give a gas velocity of up to 20 m/s. A lean absorbent inlet with a diameter of 169 mm at the idle rotor shaft will give an absorber velocity of 10 m/s. In order to rotate the assembly at 450 rpm to achieve 400 G on the absorbent in the absorber packing, 1250 kW is required for transport of the lean absorbent alone. The power consumption for the gas will be lower because momentum is exchanged from the lean absorbent.

Figure 2:
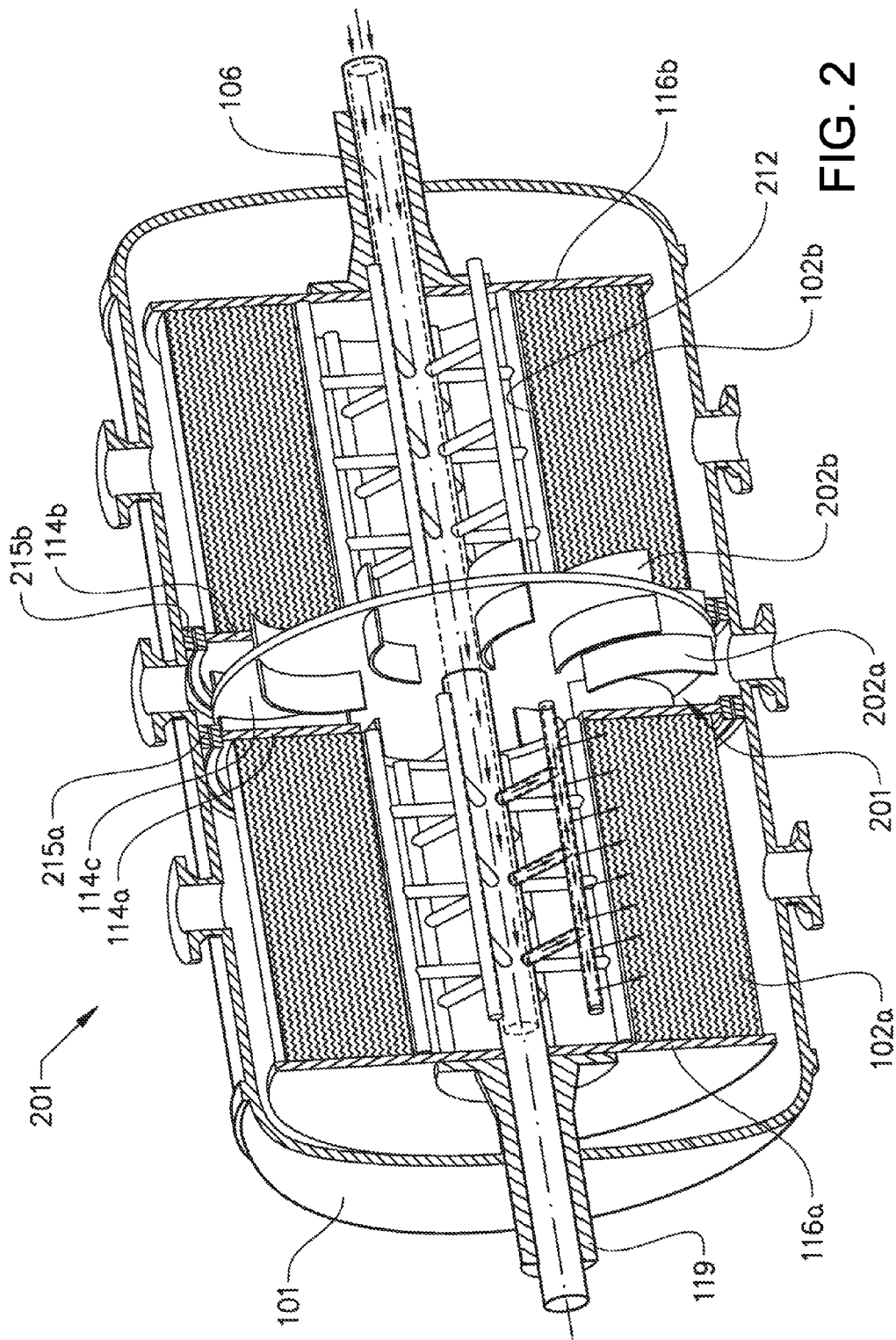
FIG. 2 shows a cross-section through a first alternative embodiment of an absorber for use in a process according to the invention.

FIG. 2 shows a cross-section through a first alternative embodiment of an absorber for use in a process according to the invention. The absorber in FIG. 2 differs from that of FIG. 1 in that it comprises an absorber provided with means for recuperating energy from the gas flow through the absorber. The recuperating means is placed within the open section 113 between the absorber packings 102a, 102b, as shown in FIG. 1, and comprises a radial discharge fan 201 with curved radial vanes, as shown in FIG. 2. In FIG. 2, the radially open section 113 is separated from the natural gas inlets (not shown) and the facing end surfaces of the absorber packings 102a, 102b by first and second radial walls 114a, 114b. A third radial wall 114c is located between the first and second radial walls 114a, 114b and extends from the inlet shaft 106 to the outer perimeter of the absorber packings 102a, 102b. The third radial wall 114c is provided to guide the flow of sweet natural gas from the inner perimeter of the absorber packings towards the natural gas outlets (not shown).

The radial discharge fan 201 comprises a first and a second set of radial vanes 202a, 202b, wherein the first set of radial vanes 202a is attached between the first radial wall 114a and the third radial wall 114c. Similarly, the second set of radial vanes 202b is attached between the second radial wall 114b and the third radial wall 114c.

The radial vanes have several functions, such as acting as a mechanical, torque transmitting connection between the two absorber sections, assisting in transport of sweet gas from centre to periphery while recovering some of the momentum to rotational power, and assisting in separating rich absorbent droplets from the sweet natural gas. The latter function requires droplet traps to be integrated in the design, as described for the embodiment according to FIG. 1 above.

The energy recovery is achieved by guiding sweet natural gas through the radial vanes 202a, 202b in the radially open section 113, whereby some of the momentum from the pressurized sweet natural gas flowing towards the outlet is transferred to the vanes of the discharge fan 201. The recovered momentum causes a driving torque applied to the rotor shaft and assists in rotating the absorber assembly.

Figure 3:
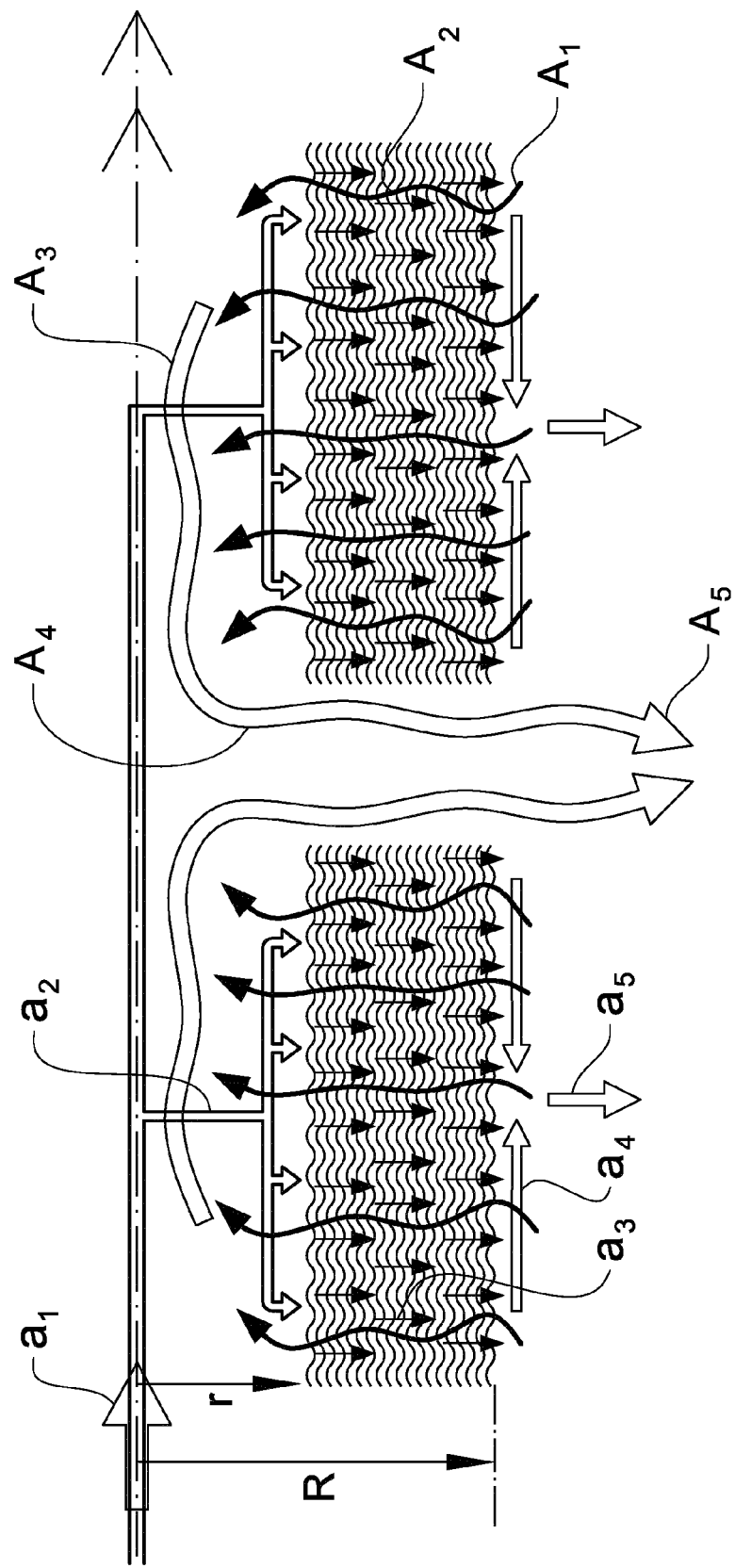
FIG. 3 shows a schematic diagram of the flow of absorbent and natural gas through the absorbers of FIG. 1 and FIG. 2.

FIG. 3 shows a schematic illustration of the flow patterns of fluids in the rotated absorber assembly in the rotational symmetric radial-axial plane of the units shown in FIGS. 1 and 2. Absorbent medium is supplied from an inlet $a_1$ through a central rotor shaft and is distributed on the inner perimeter $a_2$ of the absorber packing. The lean absorbent is distributed and transported $a_3$ to the outer perimeter $a_4$ by the high centrifugal forces (high G) in the rotating absorber assembly. The rich absorbent is then removed via an outlet $a_5$ for processing and re-use. The sour gas is supplied from inlets $A_1$ at the outer periphery of the absorber packing and is forced towards the centre of the assembly in the opposite direction $A_2$ allowing efficient cross flow for mass transfer of $CO_2$ to the lean absorbent. The sweet gas is guided along the inner perimeter $A_3$ and then outwards $A_4$ through an open section from the axial centre of the assembly. This open section can have vanes allowing recovery of kinetic energy from the gas as well as droplet traps to remove absorbent droplets carried over in the gas. Finally, the sweet gas is removed form the assembly through an outlet $A_5$.

Figure 4:
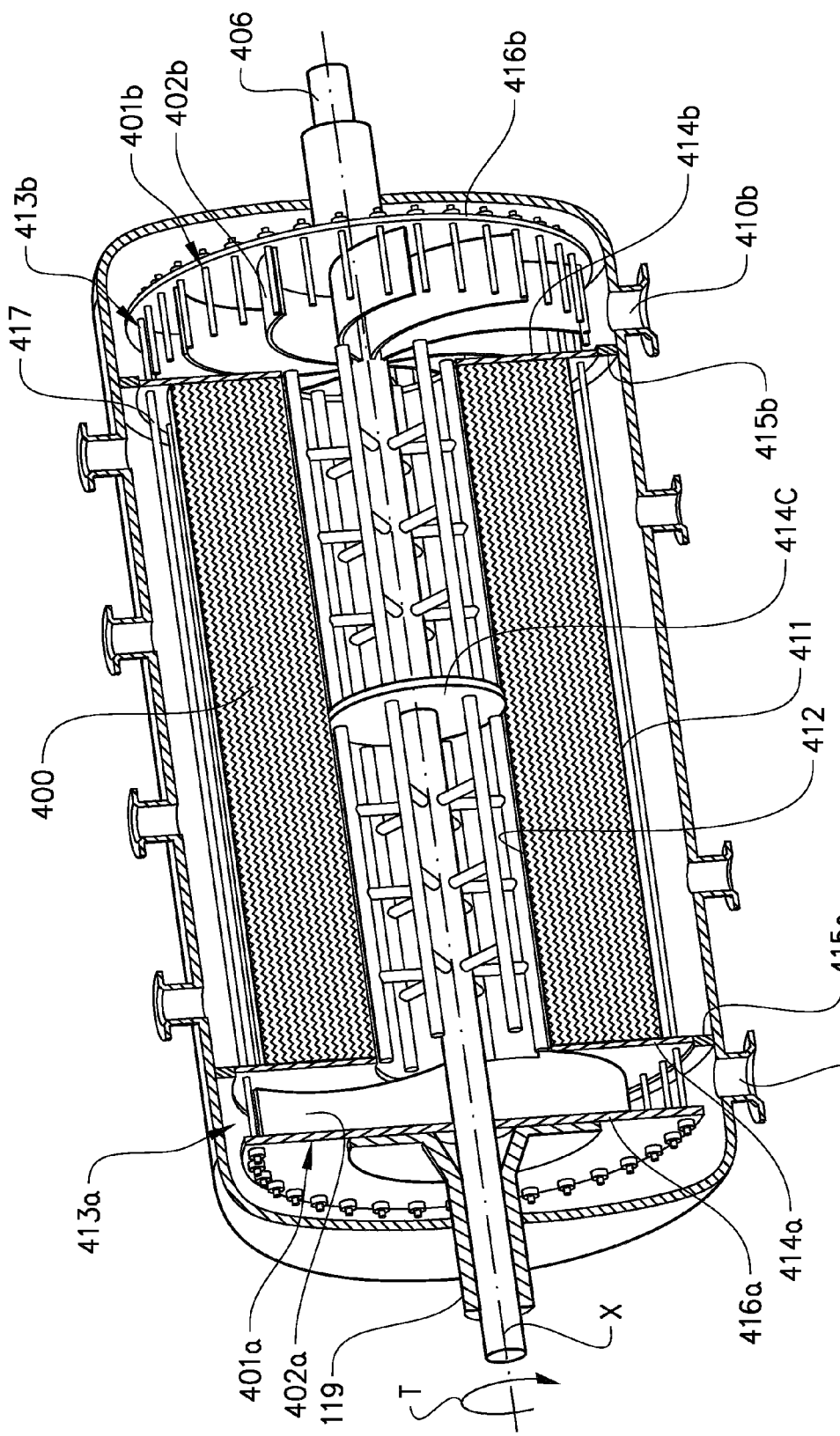
FIG. 4 shows a cross-section through a second alternative embodiment of an absorber for use in a process according to the invention.

FIG. 4 shows a cross-section through a second alternative embodiment of an absorber for use in a process according to the invention. The absorber in FIG. 4 differs from that of FIG. 2 in that it comprises an absorber provided with means for recuperating energy from the gas flow through the absorber placed within a first and a second open section 413a, 413b at either end of an absorber packing 400. Each open section 413a, 413b comprises a radial discharge fan 401a, 401b with curved radial vanes, similar to the arrangement shown in FIG. 2. In FIG. 4, the radially open sections 413a, 413b are separated from the natural gas inlets (not shown) and the opposite end surfaces of the absorber packing 400 by first and second radial walls 414a, 414b. A third radial wall 414c is located in a position equidistant from the first and second radial walls 414a, 414b and extends from the inlet shaft 406 to the inner perimeter 412 of the absorber packing 400. The third radial wall 414c is provided to guide the flow of sweet natural gas from the inner perimeter of the absorber packing towards the natural gas outlets 410a, 410b. This arrangement also ensures that the flow of natural gas is distributed so that each radial discharge fan 401a, 401b will receive approximately the same gas flow.

The radial discharge fans 401a, 401b comprise a first and a second set of radial vanes 402a, 402b, wherein the first set of radial vanes 402a is attached between the first radial wall 414a and a first rotor end plate 416a. Similarly, the second set of radial vanes 402b is attached between the second radial wall 414b and a second rotor end plate 416b, in order to form a an absorber packing assembly or rotor assembly. The rotor assembly is held together by means of multiple axial tension rods 417 (schematically indicated in Fig.4) which extend through all the radial walls in the assembly outside the outer perimeter 411 of the absorber packing and are bolted to the rotor end plates. The absorber packing assembly comprises a single absorber packing which is symmetrical on either side of a central plane at right angles to the rotational axis of the absorber packing. The central plane is, in this case, taken through a position located at the mid-point of the single absorber packing along the axis of rotation.

As stated above, the radial vanes have several functions, such as acting as a mechanical, torque transmitting connection between the two absorber sections, assisting in transport of sweet gas from centre to periphery while recovering some of the momentum to rotational power, and assisting in separating rich absorbent droplets from the sweet natural gas. The latter function requires droplet traps to be integrated in the design, as described for the embodiment according to FIG. 1 above. In the embodiment of FIG. 4, the radial walls 414a, 414b extends from the inner perimeter of the annular absorber packing to a gas tight labyrinth seal 415a, 415b at the inner wall of the vessel.

The energy recovery is achieved by guiding sweet natural gas through the radial vanes 402a, 402b in the radially open section 413a, 413b, whereby some of the momentum from the pressurized sweet natural gas flowing towards the outlet is transferred to the vanes of the discharge fans 401a, 401b. The recovered momentum causes a driving torque applied to the rotor shaft 119 and assists in rotating the absorber assembly.

Figure 5:
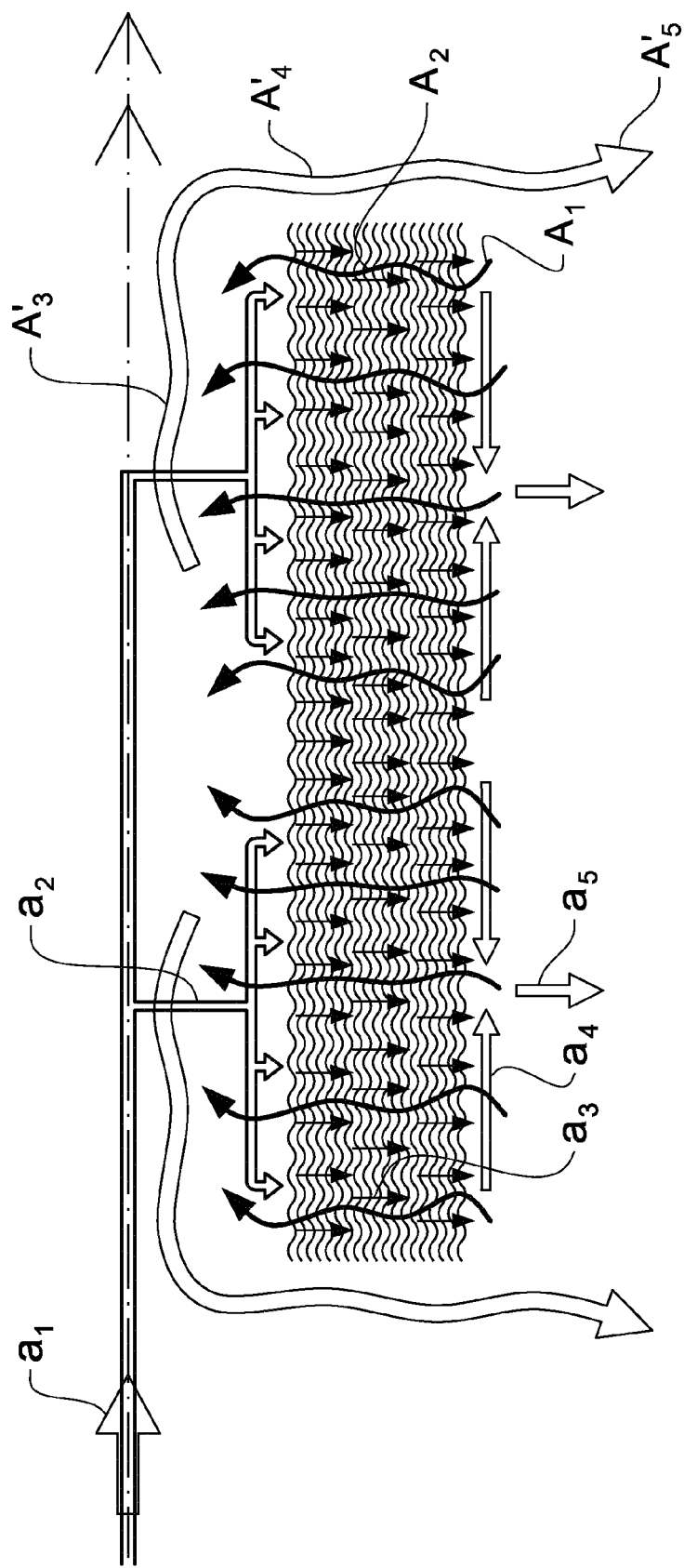
FIG. 5 shows a schematic diagram of the flow of absorbent and natural gas through the absorber of FIG. 4.

FIG. 5 shows a schematic illustration of the flow patterns of fluids in the rotated absorber assembly in the rotational symmetric radial-axial plane of the unit shown in FIG. 4. Absorbent medium is supplied from an inlet $a_1$ through a central rotor shaft and is distributed on the inner perimeter $a_2$ of the absorber packing. The lean absorbent is distributed and transported $a_3$ to the outer perimeter $a_4$ by the high centrifugal forces (high G) in the rotating absorber assembly. The rich absorbent is then removed via an outlet $a_5$ for processing and re-use. The sour gas is supplied from inlets $A_1$ at the outer periphery of the absorber packing and is forced towards the centre of the assembly in the opposite direction $A_2$ allowing efficient cross flow for mass transfer of $CO_2$ to the lean absorbent. The sweet gas is guided along the inner perimeter $A_3$ and then outwards $A'_4$ from the axial centre of the assembly through open sections at each end of the assembly. The open sections can have vanes allowing recovery of kinetic energy from the gas as well as droplet traps to remove absorbent droplets carried over in the gas. Finally, the sweet gas is removed form the assembly through outlets $A'_5$ at each end of the assembly.

Figure 6:
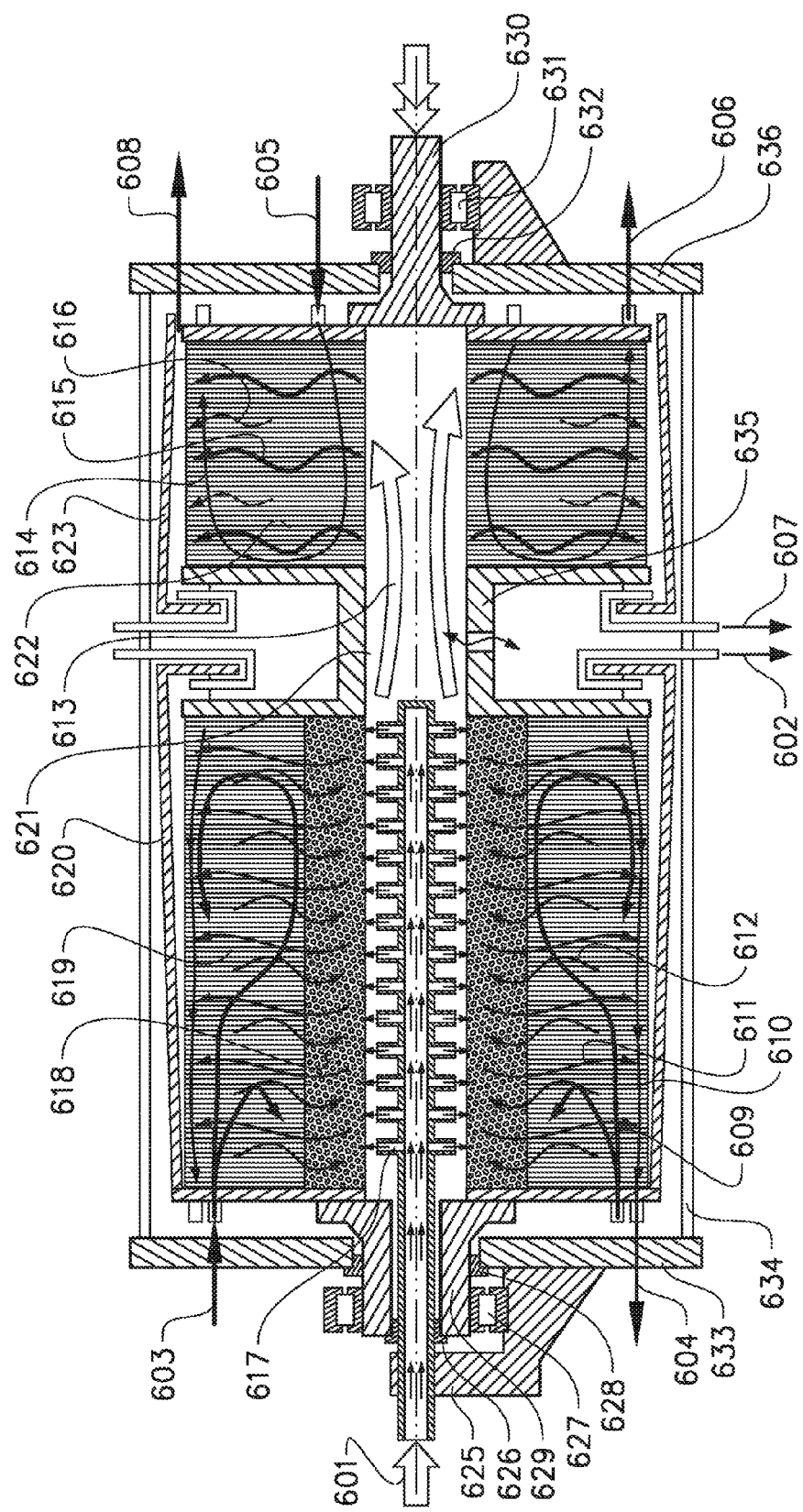
FIG. 6 shows a first embodiment of a desorber for use in a process according to the invention.

FIG. 6 shows a first embodiment of a desorber for use in a process according to the invention. The axis of rotation of the desorber is horizontally aligned. Arrows in FIG. 6 schematically illustrates the directions of flow through the desorber. The cover enclosing the units making up the desorber is schematically indicated in the figure. Although only one rotating desorber wheel is described below, the desorber is preferably configured with two identical, mirrored desorber/condenser units on each side of a plane at right angles to the axis of rotation.

The desorber for the process is provided with a number of Inlets and outlets. A desorber unit comprises an annular stripper unit 618 rotatable about a hollow central rotor axle 629 having a rich absorbent inlet 601. The rich absorbent is supplied through a static pipe mounted into the centre of the hollow rotor axle 629 by means of a fixture 625. The absorbent inlet 601 supplies rich absorption medium to an inner portion of a first rotating desorption zone 618, or stripper, causing the rich absorption medium to flow radially outwards through the first rotating desorption zone (see arrow 611). A number of absorption medium distribution pipes 617 are arranged to distribute the rich absorbent over the inner surface of the first rotating desorption zone 618. A packing with a relatively high specific surface area can be used in the first rotating desorption zone 618 due to the centrifugal forces created by the rotation. Heated vapour is supplied to an outer perimeter of the first rotating desorption zone 618, causing the vapour to flow radially inwards (see arrow 612) in order to create a radial cross-flow in the first rotating desorption zone 618. During this radial cross-flow a first portion of acid gases are desorbed from the rich absorption medium by the hot vapour during said radial cross-flow. The cross-flow is created by vapour under pressure being forced radially inwards and the rich absorption medium being forced radially outwards by centrifugal forces caused by the rotation of the first desorption zone 618. The release of the first portion of acid gases is achieved by the said vapour heating the absorption medium to a predetermined temperature, which is dependent on the type of absorption medium used.

The partially regenerated absorption medium will be forced through the first rotating desorption zone 618 and into the second rotating desorption zone 619, or reboiler, where the remaining acid gases are removed to produce a lean absorption medium. The the second rotating desorption zone 619 comprises a heat exchanger made up of a large number of thin, closely stacked discs. Desorption is achieved by supplying a hot medium, such as steam, to the heat exchanger in the second rotating desorption zone 619, wherein the remaining portion of the acid gases and a portion of the absorption medium containing amine and liquid diluent are heated to form a vapour. Steam is supplied through a steam inlet 603 comprising a ring volume between a first end lid and the rotating desorber unit. In this example, the first end lid of the desorber unit faces away from the condenser unit, while the second end lid faces the condenser unit. The ring volume is sealed by a labyrinth seal, as mechanical contact may not be used in view of the high tangential velocities. A number of horizontal connecting channels 609 between the steam conducting discs ensures a good axial distribution of steam. The evaporation causes an increase in pressure which forces the hot vapour radially inwards through both the second and the first rotating desorption zones 619, 618. This flow of vapour through the first rotating desorption zone has been described above. The absorption medium is thrown outwards into a concentric collection trough 620 that is an integrated part of the rotor. The kinetic energy is recovered by a special pitot tube arrangement. A series of pitot tubes will be mounted around the stator to obtain enough capacity to remove the large quantity of absorbent treated. Lean absorption medium is removed from an outlet 602 at the outer perimeter of the second rotating desorption zone 619 and transferred back to an absorber. The desorber unit is provided with an outlet 604 for pressurized condensate from the hot side of the heat exchanger in the second rotating desorption zone 619. Horizontal connecting channels 610 near the periphery of the desorber unit collect the condensate and enable flow of condensate to the condensate outlet 604. The vapour containing diluent vapour, remaining absorbent medium in vapour form and acid gas, such as $CO_2$ is collected in a central flow channel 621 leading to a condenser unit (see arrow 613).

The first and the second rotating desorption zones described above are preferably arranged as concentric annular desorption zones rotating about a common central axis. The first rotating desorption zone 618 performs the same function as a conventional stripper unit, while the second rotating desorption zone 619 performs the same function as a conventional reboiler unit.

The desorber in FIG. 6 comprises a condenser unit provided with a single condenser section 622 placed side-by-side with the desorber unit. The condenser unit is supplied by a source of coolant, such as water, through a coolant inlet 605 comprising a ring volume between a first end lid and the rotating condenser unit. In this example, the first end lid of the condenser unit faces away from the desorber unit, while the second end lid faces the desorber unit. The ring volume is sealed by a labyrinth seal. The coolant is introduced adjacent the inner portion of the condenser section and flows radially outwards (see arrow 614) to a coolant outlet 606 adjacent the outer portion of the condenser section. The coolant outlet 606 comprises a further ring volume between the first end lid and the rotating condenser unit. This ring volume is also sealed by a labyrinth seal. In this example, the portion of the vapour containing absorption medium received from the desorber section is condensed in a single step. The condenser section 622 is made up of a number of closely stacked, thin coolant filled discs. The condensed liquid containing amine and diluent flows radially outwards (see arrow 616) and is removed from the outer portion of the first section of the rotating condenser. A conical collection trough 623 using pitot tubes is used for removing process condensate to a condensate outlet 607. The condensed liquid is returned to the inner perimeter of the first or the second rotating desorption zone. At the same time, desorbed acid gases from the outer portion of the condenser section are removed through a ring volume provided with labyrinth seals. The acid gases flows radially outwards (see arrow 615) and are passed to an outlet 608 and are removed from the desorber for further processing.

The cover enclosing the desorber and condenser units comprises a stationary first end cover 633, a stationary second end lid cover 636 and a cylindrical stator part 634 connecting the end covers. The desorber and condenser units are supported by the rotor axle 629, which is mounted in a first rotor bearing 627 at the first end cover 633, and a driving axle 630, which is mounted in a second rotor bearing 631 at the second end cover 636. A first and a second seal 628, 632 are arranged between the rotor axle 629 and the first end cover 633, and the driving axle 630 and the second end cover 636, respectively. A further seal 626 is arranged around the outer surface of a central pipe making up the absorbent inlet 601 and the the rotor axle 629. The desorber and condenser units are connected by a hollow intermediate axle 635 connecting the second end lid of the desorber unit and the second end lid of the condenser unit.

Although only one rotating desorber wheel is shown in FIG. 6, the desorber is preferably configured with two mirrored desorber/condenser units on each side of a plane at right angles to a common axis of rotation. In this case, the absorbent medium is supplied at both ends of the mirrored units, and the driving axle replaces one of the rotor axles.

Figure 7:
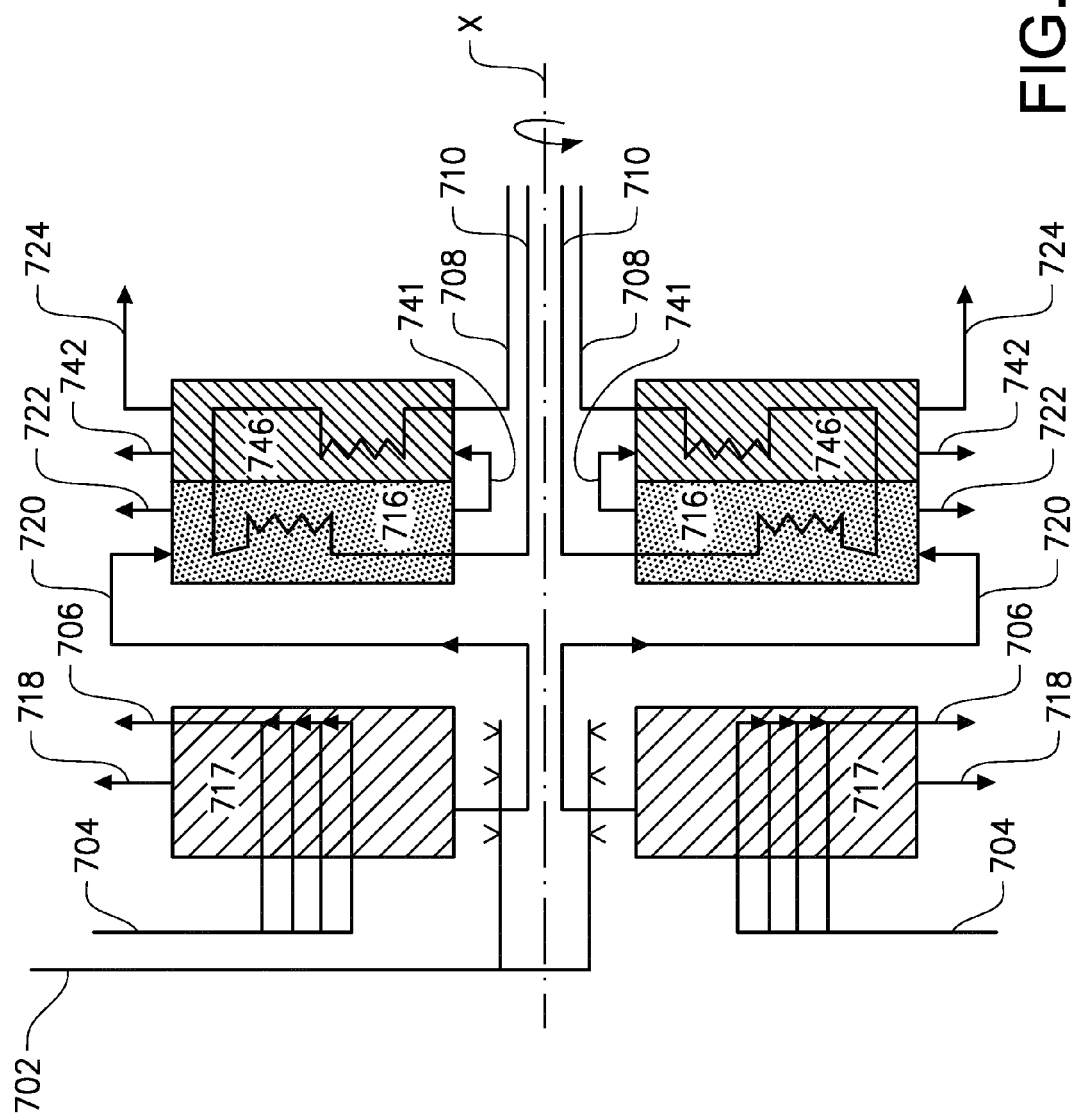
FIG. 7 shows a second embodiment of a desorber for use in a process according to the invention.

FIG. 7 shows a second embodiment of a desorber for use in a process according to the invention where the axis of rotation is horizontally aligned. The embodiment has a number of similarities with the embodiment shown in FIG. 6. The main difference between the embodiments is the condenser arrangement. FIG. 7 schematically illustrates the directions of flow through the alternative desorber. The cover enclosing the units making up the desorber is not shown in this schematic figure.

FIG. 7 shows an integrated annular stripper and stripper and reboiler unit 717 unit rotatable about an axis X. In the illustrated embodiment the stripper and reboiler unit 717 is designed with a number of small diameter tubes for heat supply. Steam is supplied trough conduit 704 and passed through the tubes running in parallel with the axis of rotation. The tubes are in communication with a conduit 706 for removing the condensated steam. For the purpose of illustration a number of tubes are indicated parallel to the axis of rotation. However, the stripper and reboiler unit may comprise any number of tubes. In this embodiment the stripper is integrated in the reboiler. The $CO_2$ rich absorbent medium is introduced via conduit 702 and the stripping will take place when the absorbent medium is introduced at an inner perimeter of the stripper and reboiler unit 717. Regenerated lean absorbent medium leaves the stripper and reboiler unit 717 at the outer circumference thereof at a lean absorbent medium outlet 718. The $CO_2$ and an amount of absorbent medium comprising absorbent and diluent in vapour phase leaves the stripper and reboiler unit 717 near its inner perimeter and is passed into conduit 720. The $CO_2$ and absorbent medium vapour is then directed into the outer perimeter a first condenser section 716.

In order to create additional surface area for the mass transfer, it is proposed in one aspect of the invention to include layers of thin metal mesh between the rows of reboiler tubes having, for instance, a 6 mm internal and 9 mm external diameter will give a reboiler specific surface of 233 $m^2/m^3$. Other dimensions and configurations may of course equally well be used. A fine metal mesh with wire diameter 0.5-1 mm diameter gives specific surface areas over 1000 $m^2/m^3$, depending on mesh spacing. The small tubes can be fixed to the end plates using conventional roller expander techniques. In this embodiment it is proposed to use horizontal tubes in the stripper and reboiler unit instead of sloping tubes. This is mainly because of design and manufacturing considerations. This solution requires that the tubes are open in both ends with condensate draining at the end closest to the condenser section 716. The steam that flows from inlet 704 to outlet 706 is gradually converted to condensate and drained through the outlet 706. The condensate can be removed by means of a fluid mechanical seal located on the stator cylinder at the same axial position, or by using return channels to the stator end cover.

In one aspect of the present invention sieve trays or perforated plates are included between the rows of tubes for heat supply instead of thin metal mesh. The sieve trays/perforated plates will increase the area of liquid gas contact and also contribute to enhanced distribution of the liquid phase.

In another aspect of the present invention small spherical elements can be included between the rows of tubes.

Due to steam consumption considerations it is preferred to use a design with $CO_2$ gas flow towards the rotation centre. The regenerated absorbent medium will flow towards the periphery under the influence of centrifugal forces generated by the rotation of the stripper and reboiler unit 717. Subsequently, the gas is guided from the central portion of the stripper and reboiler unit 717 to the outer perimeter the first condenser section 716. This can be achieved by including radial flow channels with rigid steel plates.

The embodiment illustrated in FIG. 7 comprises a two stage condenser unit comprising a first condenser section 716 and a second condenser section 746 mounted on the same axis of rotation X as the stripper and reboiler unit 717. Cooling liquid is entered at the centre of the second condenser section 746 through conduit 708 and flows radially outwards through the second condenser section 746 to an outer portion thereof. The cooling liquid is then supplied to an outer portion of the first condenser section 716 and flows radially inwards before being removed through conduit 710 arranged at the centre of the first condenser section 716.

In the first condenser section 716 diluent and absorbent is condensed and will due to the rotation of the condenser unit be transported to the outer perimeter where it leaves the condenser section 716 as a liquid stream at an outlet 722. The outlet 722 can be connected to the absorbent medium inlet 702 at the stripper and reboiler unit 717 to return the condensed absorbent medium as reflux. The reflux of condensed vapour towards the outlet 722, creates a cross-flow over the gas mixture in the first condenser section 716. This reflux contributes to the elimination of absorbent vapour from the desorbed $CO_2$. The remaining vapour comprising $CO_2$ and diluents is passed from the first to the second condenser section 746 through a conduit 741 at the inner periphery of the respective condenser sections. In the second condenser section 746 a diluent free of absorbent is condensed and leaves the second condenser unit as a liquid stream at an outlet 742 at the outer periphery of the second condenser section. If water is used as diluent the obtained water stream from the second condenser section 746 may in one aspect of the present invention be utilized as washing liquid in the absorption process to remove traces of the absorbent from the regenerated $CO_2$ gas stream. The gas stream leaving the outlet 724 at the outer periphery of the second condenser unit will contain the desorbed $CO_2$ fit for drying and compression if needed for sequestration.

Although only one rotating desorber wheel is shown in FIG. 7, the desorber is preferably configured with two mirrored desorber/condenser units on each side of a plane at right angles to a common axis of rotation. This arrangement solves a number of mechanical challenges. In the above example, the plane is located between two identical condensers. The axial load on the desorber caused by the high pressure steam supplied for heating of the process is more than 100 tons. The symmetry implies that the load on each desorber is eliminated by the load of the opposite desorber. Another advantage is that the mass and energy flow to each part is reduced by 50% which makes the inflow and outflow of liquids/gases easier to handle.

Splitting the reboiler in two sections makes it possible to handle twice the volume of absorbent medium. The process according to the invention can regenerate more than 250 liters per second, which is considered to be a very large volume in comparison with conventional processes.

Yet another advantage is that the desorber section is a compact part of the rotor with respect to the mass of steel per unit volume. Splitting the reboiler in two sections and installing them as close as possible to the main bearings of the shaft reduces the mechanical loads of the rotating equipment significantly.

Still another advantage of providing symmetry according to the present invention is that the rotating desorber easily can handle varying volumes of absorbent mediums. A natural gas production plant, a gas power plant or a coal power plant does not operate at 100% all the time and the gas volume that needs to be cleaned for $CO_2$ will vary. The volume of liquid absorbent medium will thus vary. Since the liquid absorbent medium is equally distributed to the two reboiler sections, the problems with weight balance are not an issue.

Figure 8:
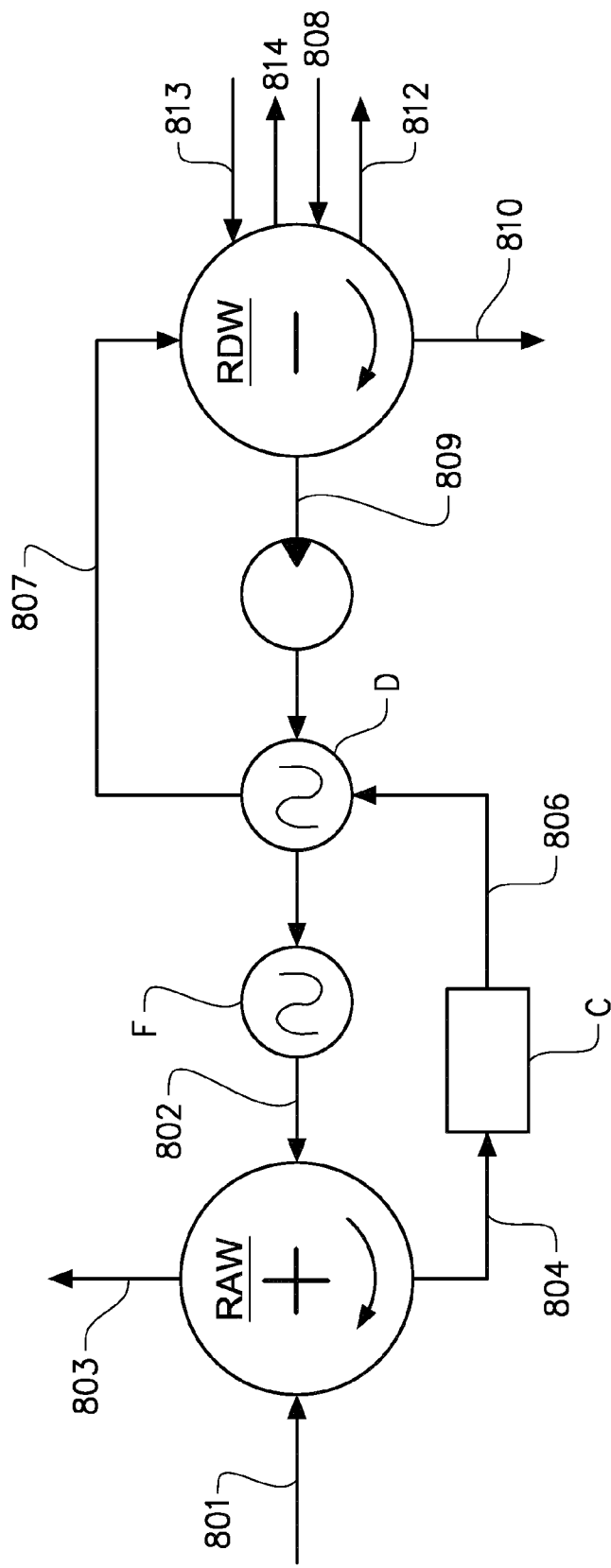
FIG. 8 shows a process according to the invention, using rotating absorber and desorber units.

FIG. 8 shows a process according to the invention, using rotating absorber and desorber units. A sour gas stream containing undesirable hydrogen sulphide ($H_2S$) and carbon dioxide ($CO_2$) is introduced to a rotating absorber wheel RAW through line 801. As the sour gas flows through the rotating absorber wheel RAW the sour gas contacts a crossflow of normal lean amine which is introduced to the rotating absorber wheel RAW through line 802. The process gas has most of the acid gases removed by the time it leaves the rotating absorber wheel RAW after contacting the lean amine from line 802. A product gas (sweet gas) having a substantially reduced content of the hydrogen sulphide and carbon dioxide is withdrawn from the top of the rotating absorber wheel RAW via line 803.

A stream of rich amine solution containing absorbed hydrogen sulphide and carbon dioxide as salts of amine is removed from the rotating absorber wheel RAW through line 804. The pressure of the solution is reduced and it then flows to a rich amine flash tank C. The flash gases exit through line 805 and the rich amine solution exits through line 806. The rich amine stream passes through the line 806 to a lean/rich absorbent heat exchanger D and is then introduced to a rotating desorber wheel RDW through line 807. Stripping of the rich amine solution is carried out in a combined rotating desorber and condenser unit within the rotating desorber wheel RDW., The rich amine is first stripped in a rotating desorber unit, using a suitable heat medium 808, such as steam, which is subsequently removed as a pressurized condensate 812. The lean amine temperature can vary from about 100° C. to 140° C., depending on the type of amine, its concentration and its pressure. The hot lean amine stream 809 exits the outer periphery of the rotating desorber wheel RDW, is passed through the lean/rich absorbent heat exchanger D and through a cooler F where the lean amine solution is cooled to a temperature of about 35° C. to 55° C. The cooled lean amine stream continues through line 802 to the top of the rotating absorber wheel RAW.

The mixture of diluents vapour from the amine stream, hydrogen sulphide, and carbon dioxide exits the rotating desorber unit and flows through a rotating condenser unit. A coolant, such as water, is supplied to the rotating condenser unit through line 813 and is removed through line 814. The condensate from the rotating condenser unit is returned to the rotating desorber unit, while the acid gases are removed through line 810 for further processing or storage.

Figure 9:
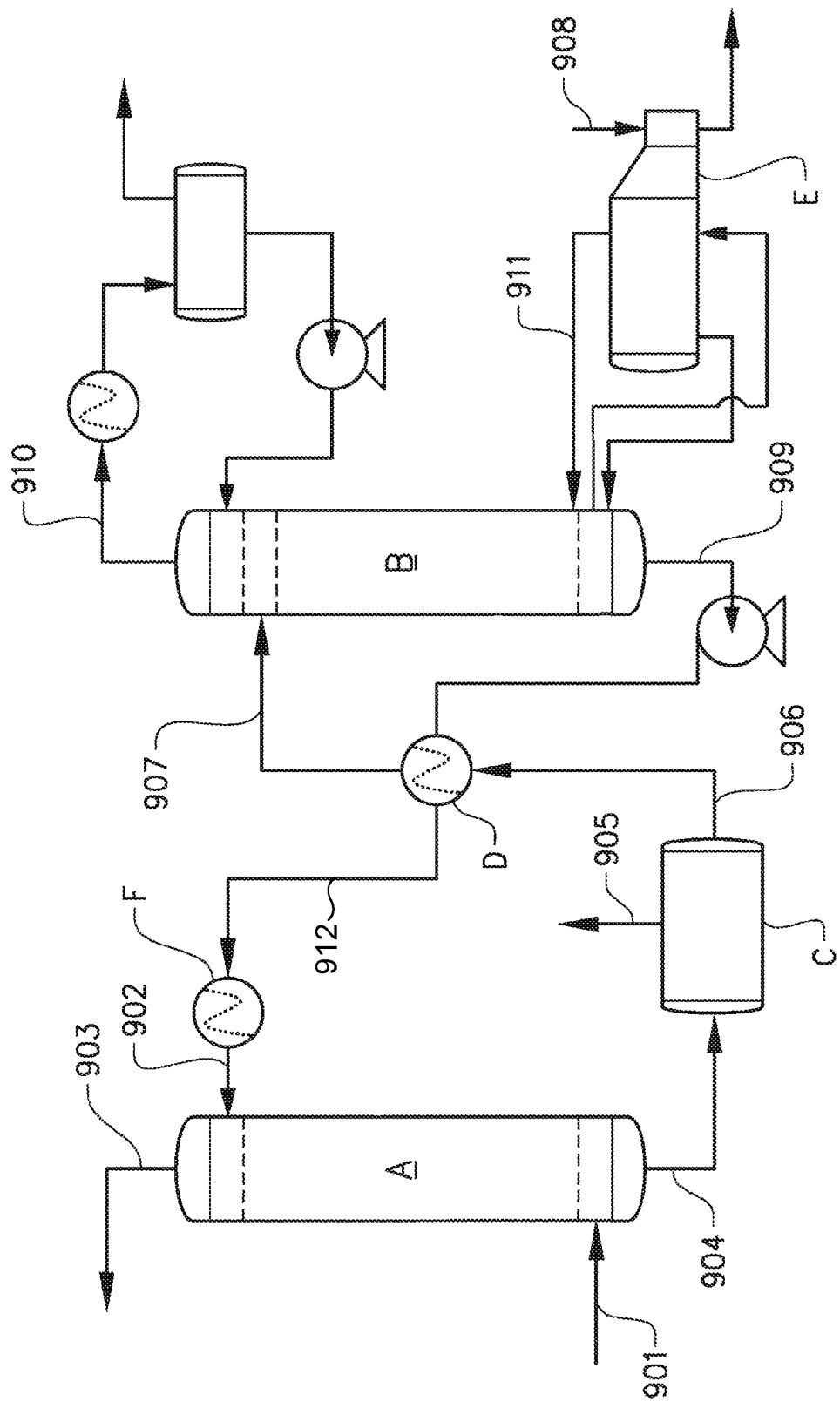
FIG. 9 shows a conventional prior art process using absorber and desorber columns.

The rotating absorber/desorber assemblies described above are significantly smaller and more compact, as compared to traditional absorbers/desorbers as shown in FIG. 9. The process according to the present invention saves footprint and weight, which can be critical in offshore installations. Since the absorber is rotated the liquid distribution for the gas/liquid contact is improved. Since the absorber rotates the absorbent medium, the viscosity of the absorbent medium will not be such a limiting factor, as compared to conventional solutions used in conventional columns, and thus higher concentration absorbent mediums can be applied. The higher concentration absorbent mediums will allow circulation rates to be significantly reduced. The higher concentration absorbent mediums will also reduce pumping duties and heating and cooling demands in the overall process. The regenerator, or stripper size can therefore also be reduced. One example of a chemical solvent/absorbent to remove $CO_2/H_2S$ from the natural gas is amines, but the invention is not limited to amines. Other suitable absorbents can be used with the same result.

In the process according to the invention, any one or more of the described absorber embodiments can be combined with any one or more of the described desorber embodiments.

The invention claimed is:
1. A process for removing acid gases from a fluid stream comprising the steps of:
supplying a pressurized fluid stream and a lean absorption medium comprising a liquid diluent and at least one amine to an absorber;
passing the fluid stream, which is in contact with the lean absorption medium within a rotating absorption zone in the absorber, wherein the acid gases are removed from the fluid stream by the lean absorption medium when passing through the rotating absorption zone;
passing rich absorption medium containing said acid gases into a first rotating desorption zone within a desorber, wherein a first portion of the acid gases are removed from the rich absorption medium by means of a heated vapour to obtain a partially regenerated absorption medium, passing the partially regenerated absorption medium into a second rotating desorption zone within the desorber; wherein a remaining portion of the acid gases are removed from the partially regenerated absorption medium by heating the partially regenerated absorption medium to evaporate said acid gases and a portion of the partially regenerated absorption medium containing amine and liquid diluent so as to form a vapour;

passing said formed vapour through said first rotating desorption zone; and passing said formed vapour to a rotating condenser within the desorber, wherein the diluent is condensed and the acid gases are removed.

2. Process according to claim 1, wherein:

supplying the lean absorption medium to an inner portion of at least one annular rotating absorber unit within the absorber, causing the lean absorption medium to flow radially outwards through the rotating absorption zone; and supplying the pressurized fluid stream to an outer portion of said annular rotating absorber unit, causing the fluid stream to flow radially inwards in order to create a radial cross-flow in the absorption zone;

wherein acid gases are absorbed from the fluid stream by the lean absorption medium during the said radial cross-flow.

3. Process according to claim 2, wherein:

removing the fluid stream from an inner perimeter of the rotating absorption zone;

removing the rich absorption medium from an outer perimeter of the rotating absorption zone, and transferring the rich absorption medium to a desorber.

4. Process according to claim 2, wherein:

supplying the lean absorption medium to a pair of identical and mirrored annular rotating absorber units rotating about a common axis within the absorber.

5. Process according to claim 1, wherein:

supplying the rich absorption medium to an inner portion of at least one annular rotating desorber unit, causing the rich absorption medium to flow radially outwards through the first rotating desorption zone; and supplying said heated vapour to an outer perimeter of the first rotating desorption zone, causing the vapour to flow radially inwards in order to create a radial cross- flow in the first rotating desorption zone;

wherein the first portion of acid gases are desorbed from the rich absorption medium by the vapour during said radial cross-flow.

6. Process according to claim 5, wherein:

supplying heat to a heat exchanger in the second rotating desorption zone, wherein the remaining portion of the acid gases and a portion of the absorption medium containing amine and liquid diluent are heated to form a vapour, removing lean absorption medium from an outer perimeter of the second rotating desorption zone, and transferring the lean absorption medium to the absorber.

7. Process according to claim 5, wherein:

removing the vapour from an inner perimeter of the first rotating desorption zone;

passing the vapour to an outer portion of the rotating condenser.

8. Process according to claim 7, wherein:

supplying the heated vapour to the outer portion of a first section of the rotating condenser, causing the vapour to flow radially inwards through the first section of the rotating condenser, condensing the portion of the absorption medium containing amine and diluent into liquid amine and a portion of liquid diluent;

removing condensed liquid amine and diluent from the outer portion of the first section of the rotating condenser, and returning the condensed liquid to the inner perimeter of the first or the second rotating desorption zone.

9. Process according to claim 8, wherein:

supplying the remaining heated vapour to an inner portion of a second section of the rotating condenser, causing the remaining heated vapour to flow radially outwards through the second section of the rotating condenser, condensing the remaining portion of diluent; and removing liquid diluent and desorbed acid gases from the outer portion of the second section of the rotating condenser.

10. Process according to claim 5, wherein:

supplying the rich absorption medium to a pair of identical and mirrored annular rotating desorber units rotating about a common axis within the desorber.

* * * * *